Sept. 30, 1969 J. D. USHER 3,469,615
RECIRCULATION PLATE TYPE EVAPORATORS
Filed Feb. 21, 1967 2 Sheets-Sheet 1

INVENTOR
JOHN DENNIS USHER
BY

ATTORNEYS

United States Patent Office 3,469,615
Patented Sept. 30, 1969

3,469,615
RECIRCULATION PLATE TYPE EVAPORATORS
John Dennis Usher, Redhill, Surrey, England, assignor to The A.P.V. Company Limited, Crawley, England, a British company
Filed Feb. 21, 1967, Ser. No. 617,616
Claims priority, application Great Britain, Mar. 15, 1966, 11,232/66
Int. Cl. B01d 1/22
U.S. Cl. 159—13    3 Claims

ABSTRACT OF THE DISCLOSURE

A plate evaporator, particularly of the rising and falling film type for heat sensitive liquids, wherein the plates are divided into two groups by a partition having an aperture for the passage of the vapour and concentrate to link the vapour and concentrate discharge ports in the two groups, the said aperture being associated with a sump type outlet for dischargeing the bulk of the liquid passing into the said aperture, the two groups being connected in series as far as the product to be concentrated is concerned.

---

This invention relates to plate evaporators.

In all types of evaporators it is important to ensure good liquid distribution over the heating surfaces as otherwise there is a risk of starvation of liquid which will result in burning-on of the product and the resulting deposition will shorten the length of run of the plant before cleaning becomes necessary. This applies especially to the outlet end of the heating surface where, because of concentration, liquid flow rate is a minimum, and it is particularly important in the case of single pass evaporators, as distinct from the natural circulation type, because of the low liquid flow rates involved. Single pass evaporators have a particular application for heat sensitive liquids where their low hold-up time results in the minimum effect on product quality. Where concentration ratios are high and product, i.e. liquid, flow rates are therefore low, it is frequently necessary to introduce the recirculation of a certain amount of the product back to the evaporator feed in order to maintain the liquid flow rate over the heating surfaces sufficiently high to avoid burning-on. This recirculation is undesirable inasmuch as it increases the hold-up time within the evaporator and reduces the heat transfer co-efficient so that the full advantages of single pass evaporator in this respect cannot be realized.

One type of plate evaporator well known to the art is described in Goodman's Patents 2,960,160 issued Nov. 15, 1960, and 3,155,565, issued Nov. 3, 1965. It is a climbing and falling film evaporator in which the liquid to be evaporated is fed into a number of plate units in parallel, each unit consisting of four plates. Liquid enters at the base of a climbing plate in which it rises vertically, while boiling, to the top of the plate where it passes through a transfer port and enters a falling film plate in which it descends vertically while undergoing continuous concentration by the action of boiling. The mixture of liquid and vapour leaves the bottom of the falling film plate and enters a duct from which it is conducted into a cyclone separator. The climbing and falling film plates are separated by plates which are supplied with heating steam, all four plates being suitably sealed by rubber gaskets. Each group of four plates, which is known as a plate unit, is connected to the liquid feed in parallel so that when a high concentration is required it is necessary to compensate for the low product flow rate by recirculating part of the product to the feed, thereby incurring the disadvantages which have already been described.

In order to achieve the desired product flow rate over the plates it is proposed to reduce the number of plate units carrying vapour and fully concentrated product by changing from a parallel to a series-parallel arrangement. This is achieved according to the invention by dividing the plates or a plate evaporator into two or more groups having a common steam supply, and arranging for the vapour to be separated from the partially concentrated product emerging from one group before this partial concentrate is fed to the next group.

With two groups the product rate per plate is effectively doubled.

The invention accordingly consists in apparatus for concentrating a feed liquid, comprising a pack of units each comprised of plates assembled face to face in a frame and including gaskets defining alternating boiling passages and heating medium flow passages allowing flow of the feed liquid and heating medium between supply and return ports formed by aligned apertures in the plates, wherein the pack of plate units is divided into two or more groups by one or more chambered partitions, each chambered partition having an aperture aligned with the product return (vapour) ports of the groups so as to allow all the vapour to be fed to a single cyclone or like separator, the chambered partition being provided with a sump for removal of the major portion of the concentrate from one group of plates as the mixture of vapour and concentrate flows through the aperture in the chambered partition. aligned with the heating medium supply ports of the groups of plates, and means for passing the partial concentrate from a first group for further concentration into a second of the groups of plates.

Normally there will be only two groups of plates.

In a preferred embodiment, the sump is used to remove the final concentrate and a single cycle separator is used to separate the partial concentrate from all the vapour.

Thus only one cyclone separator will be needed for each evaporator.

The invention is intended to apply primarily to duties involving high concentration ratios where the product rate per plate unit is low and recirculation is normally required. Under high concentration conditions both the density and the viscosity of the product are high, so that very little atomisation of the concentrate occurs. Instead therefore of being carried along with the vapour in the form of fine droplets as would be the case with lighter concentrates, the product in this case will fall to the bottom of the vapour duct in the plates where it will be collected by the sump of the partition instead of being carried over into the separator. The efficiency of the arrangement obviously depends on satisfactory collection of the product in the sump of the partition and tests have established that with high density, high viscosity concentrate this aspect is satisfactory and very little product gets carried over by the vapour stream into the main cyclone separator.

The invention will be further described with reference to the accompanying diagrammatic drawings, wherein.

Figure 1:
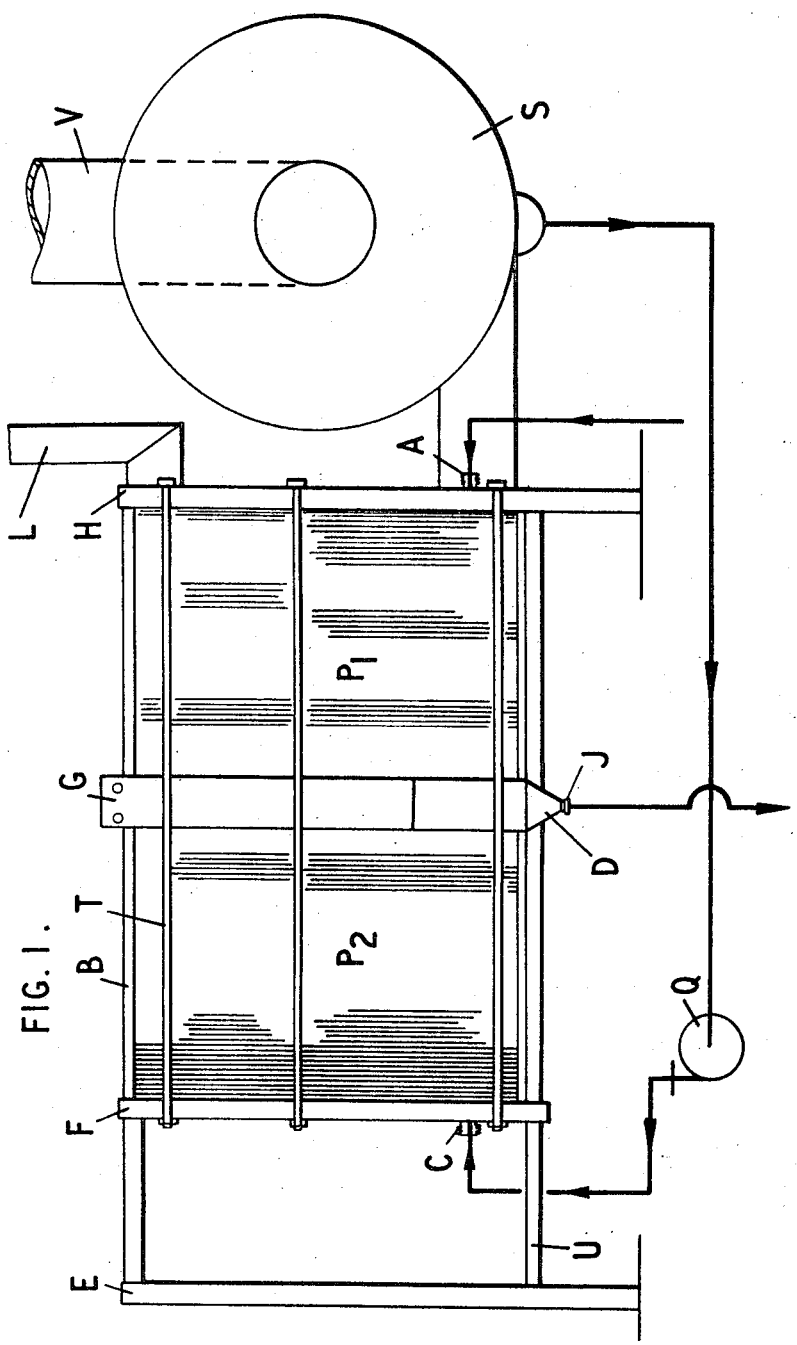
FIGURE 1 shows a preferred form of evaporator according to the invention.

FIGURE 1 shows two groups of plate units $P_1$ and $P_2$ mounted in a frame which includes a head H, a follower F and an end support E, the individual plates being clamped between the head and follower by tie bars T and carried on a top bar B and a bottom bar U mounted between the head H and end support E. Feed is introduced into the plates through the head H at A. The arrangement of the plate units within each group is substantially as in Goodman's Patent 2,960,160 and 3,155,565 already referred to wherein the plates are divided into units of four plates. The plate units are in parallel and each includes a rising boiling passage and a following boiling passage connected by a transfer port.

Figure 3:
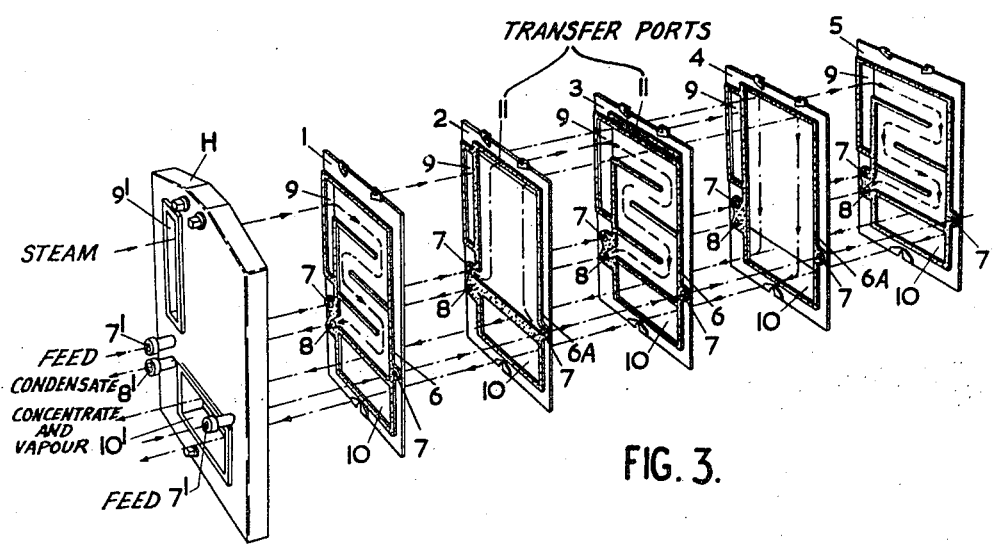
FIGURE 3 is an exploded perspective view of a plate unit, illustrating the flow paths.

FIGURE 3 is a perspective view of a plate unit, plus a head H. Three plates 1, 3, and 5 have peripheral gaskets 6 and two plates 2 and 4 have peripheral gaskets 6A, all gaskets being provided with a set of aligned apertures defining product and vapour feed and discharge ports. Thus apertures 7 form product feed ports, apertures 8 provide a condensation discharge port, apertures 9 provide a steam feed port, and apertures 10 provide a concentate and vapour discharge port. The head H has corresponding apertures denoted by the same references with primes. The plates 2 and 3 each have an aperture 11 forming part of a transfer port.

The operation is as described in the Goodman patents referred to. The steam is supplied at aperture 9' and flows along the steam port provided by apertures 9. On the plates 1, 3, 5 . . . the gasket 6 allows steam to follow a sinuous path to the condensation discharge port formed by apertures 8, and the condensation is discharged through aperture 8'.

The feed liquid is fed in at apertures 7' and fed between the plates 1, 2 and 3, 4 and similar plates in other parallel units. As it rises to the aperture 11 it is heated and boiled. The liquid and vapour pass through the transfer ports formed by apertures 11 to the plate 4 wherein it becomes a falling boiling film and is discharged into the concentrate and vapour discharge port formed by apertures 10.

Figure 2:
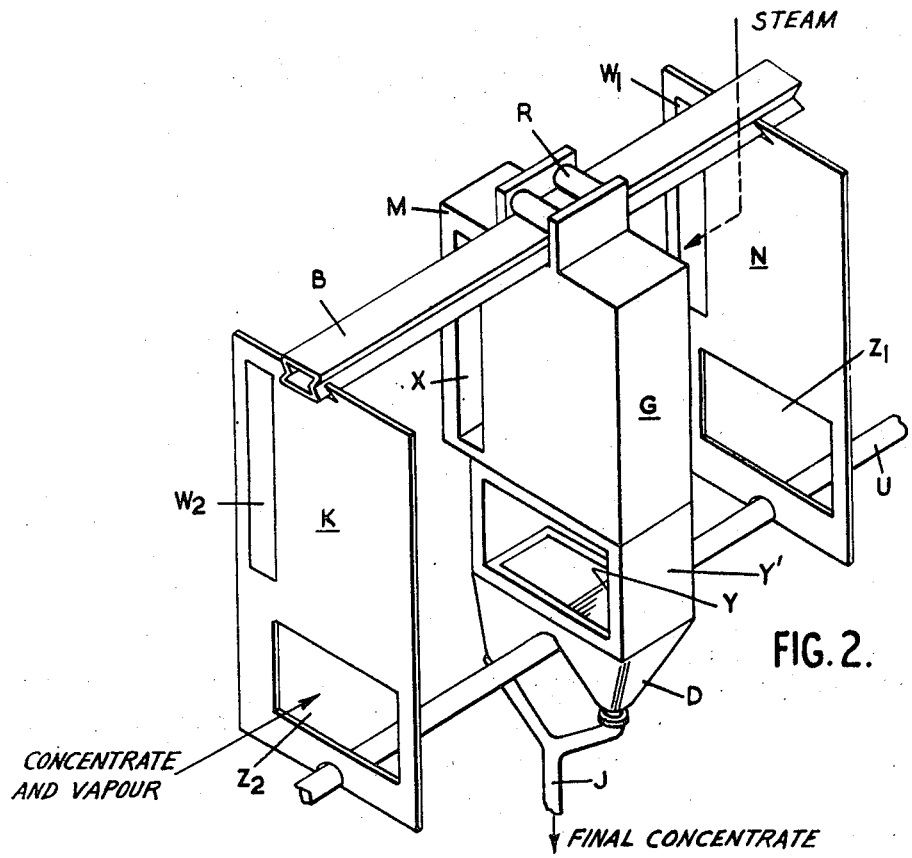
FIGURE 2 illustrates, in perspective view, some details of the structure of FIGURE 1.

In FIGURE 2, exemplary plates are shown to have steam inlet ports $W_1$, $W_2$ and vapour and concentrate discharge ports $Z_1$, $Z_2$ but the product feed ports 7 and condensate discharge ports 8 are not shown. A chambered partition G has ports aligned with the ports $W_1$, $W_2$ and $Z_1$, $Z_2$, respectively but not with the product feed port or the condensation discharge ports.

In FIGURE 1 feed liquid is admitted to the plates at A and is partially concentrated in plateage $P_1$, consisting of a plurality of plate units as seen in FIGURE 3 in parallel and the mixture of vapour and partial concentrate enters a cyclone separator S. Here the vapour is led to ducting V and the partial concentrate is extracted by a pump Q and pumped into plateage $P_2$, which also consists of a plurality of units in parallel through the follower F at C. The second stage of concentration occurs in the plurality of plate units $P_2$ and the final concentrate, is being carried towards the separator S by the vapour flow in ports $Z_1$, $Z_2$, falls into a sump D at the base of the chambered partition G where it is extracted by means of a pump or other suitable apparatus. The sump is suitably shaped to clear the bottom bar U of the frame.

It will be seen that instead of the product being spread equally over the plurality of plate units $(P_1+P_2)$, as it would have been without a chambered partition, the presence of the chambered partition enables the two sections of the plurality of plates $P_1$ and $P_2$ to be arranged in series flow so that the final product is only spread over plateage $P_2$, with the result that the product rate per plate is approximately doubled.

The construction of the grid is shown in detail in FIGURE 2. It consists of a vertical hanging member M which can be cast or fabricated in any suitable material, and this vertical member carries an elongated port X which allows the supply of steam entering the head of the machine through a steam header L to pass into the plateage $P_2$. The vertical hanging member M is fitted with rollers R which enable it to travel along the top bar B of the frame. At the lower end of the vertical hanging member M is mounted a short length of ducting Y', having an aperture Y which, when the chambered partition is clamped between the plurality of plate units $P_1$ and $P_2$ forms part of the continuous vapour passage by which the concentrate and vapour leaves the plurality of plate units $P_1$ and $P_2$ and enters separator S. This ducting Y' can be made of stainless steel or some other corrosion resistant material and embodies a sump D with an offtake connection J. K and N are exemplary adjacent evaporating plates on either side of the chambered partition. $W_1$ and $W_2$ are the steam ports which line up with port X in the chambered partition, and $Z_1$ and $Z_2$ are the vapour ports which line up with ducting Y' when the plate units and chambered partition are clamped together. The final concentrate carried by vapour through port $Z_2$ falls into sump D of the duct Y' where it is extracted through the connection J.

It is possible to fit two or more of these chambered partitions where necessary according to the concentration of the liquid required, and the degree of product rate which it is necessary to achieve.

Various modifications may be made within the scope of the invention. Thus, it is possible for the feed liquid to be supplied at C and the partial concentration to be drawn off at D and returned to A. This has the theoretical disadvantage that any partial concentrate carry over, missing the sump D, is mixed with the final concentrate and tends to dilute it.

It is furthermore possible to fit a probe or other level sensing device into the ducting Y' so that in the event of failure of the pump extracting the final product from connection J, resulting in the sump D becoming filled with this product, the steam supply to the evaporator can be automatiaclly shut off before the plates become flooded with highly viscous concentrate, a situation which could otherwise lead to severe deposition on the evaporating surfaces.

I claim:

1. In apparatus for concentrating a feed liquid comprising a frame, a pack of heat transfer plates mounted in the frame in spaced face to face relationship, said plates having aligned apertures defining feed and return ports for heating medium, a feed port for the feed liquid and a return port for the concentrated liquid and vapour, and gaskets between said plates defining alternating flow passages for the heating medium and boiling passages for the feed liquid the improvement consisting in that at least one chambered partition divides said pack of plates into a first and second group of plates, said chambered partition having an aperture aligned with the concentrate and vapour return ports of said two groups of plates, a sump connected to said last mentioned aperture for removing a portion of final concentrate from said second group of plates as the mixture of vapour and concentrate from the said second group of plates flows through said last mentioned aperture and means for passing a partial concentrate from said first groups of plates for further concentration in said second group of plates.

2. Apparatus as claimed in claim 1, comprising a single cyclone separator connected to said concentrated liquid and vapour return port of said first group of plates, the concentrate there separated being partial concentrate which is fed from said separator to said second group of plates.

3. Apparatus as claimed in claim 1, in which said chambered partition has another aperture aligned with the heating medium supply apertures in the plates of said first and second groups whereby said groups have effectively a single heating medium supply port.

References Cited

UNITED STATES PATENTS

| | | | |
|---|---|---|---|
| 2,562,739 | 7/1951 | Risberg | 159—128 X |
| 2,621,028 | 12/1952 | Newhall | 165—167 X |
| 2,639,126 | 5/1953 | Newhall | 165—167 X |
| 2,960,160 | 11/1960 | Goodman | 159—28 X |
| 3,073,380 | 1/1963 | Palmason | 159—49 |
| 3,155,565 | 11/1964 | Goodman | 159—28 X |

WILBUR L. BASCOMB, JR., Primary Examiner

J. SOFER, Assistant Examiner

U.S. Cl. X.R.

159—28; 165—166